Patented Feb. 23, 1937

2,071,368

UNITED STATES PATENT OFFICE 2,071,368

PROCESS OF MAKING LACTATE SALTS AND LACTIC ACID

Samuel M. Weisberg, Baltimore, Md., and Frank L. Chappell, William E. Stringer, and Stoddard Stevens, Hobart, N. Y., and Henning A. Trebler, Baltimore, Md., assignors to Sealtest System Laboratories, Inc., Baltimore, Md., a corporation of Maryland No Drawing. Application December 28, 1935 Serial No. 56,584

20 Claims. (Cl. 260—112)

The present invention relates to the manufacture of lactate salts and lactic acid by improved processes, which are (1) simple, rapid and inexpensive, and of particular importance are (2) susceptible of such nice control that products having the desired concentration and purity to meet substantially all of the various industrial needs for these compounds are readily made.

One object of the invention is to produce a substantially pure water-white solution of a required lactate salt by a process involving flocculation and alkalination whereby minute traces of objectionable albuminous and other substances are rendered easily and substantially completely removable.

Because of the high state of and/or the controlled state of purity of the lactate salts, they are useful for the manufacture of other lactate salts of desired controlled purity and concentration by recourse to a simple chemical reaction which is not costly of itself and does not require that existing equipment be changed, new apparatus set up, or that existing plant production be interfered with.

Likewise, with similar economic advantage, and because of the controlled purity of the lactate salts obtained, we have discovered that it is possible to produce lactic acid by simple chemical reaction from the lactate salts, which lactic acid has or may be treated to have a desired controlled purity and concentration.

In this connection, we have found that the purity of the lactic acid may be enhanced through recourse to a simple chemical reaction and/or flocculation step, whereby any objectionable heavy metal content in the lactic acid is readily removed and/or so reduced that concentration of the acid in a vacuum pan will take place without decomposition or darkening, and the evaporation will be accelerated without the usual foaming.

The lactic acid may be produced (a) from the liquor obtained by dissolving the crystalline lactate salt of high or controlled purity, (b) from the purified lactate liquor before or after concentration thereof (and before crystallization has been permitted to take place), and (c) from unconcentrated lactate liquor which has not been purified and which is in a partially neutral or neutral state produced by fermenting the lactose present in whey to lactic acid and periodically adjusting the pH of the liquor and reacting with the lactic acid formed, the cation of the desired lactate salt.

With equal facility, and because of the high and/or controlled state of purity of the lactic acid made by our processes, we have discovered that lactate salts may be readily obtained from the acid by simple chemical reaction and with substantial advantage in both quality and economy.

For a further understanding of the invention, reference will be had to the following specification in which the various products and processes are described in detail.

*Lactates*

In the manufacture of lactates, we use whey from a variety of sources, e. g., casein whey, such as muriatic, sulphuric, lactic or rennet whey, cheese whey, buttermilk whey, and whey from semi-solid buttermilk production as described in the applications of Weisberg et al., Serial Nos. 650,364 and 666,624.

With reference to the lactates formed, we produce lactates of the alkali metals, such as potassium, sodium, lithium, and ammonium lactate, as well as lactates of the alkali earth metals, such as calcium, magnesium, strontium and barium lactates. In addition, we also produce lactates of trivalent metals, such as aluminum, iron, and chromium lactates. In fact, we produce, in accordance with this invention, a wide variety of salts of lactic acid.

There are several processes which may be employed, and these will now be exemplified.

*Process I—Purified lactate salts from whey*

For purposes of illustration, we shall describe this process in connection with the manufacture of calcium lactate, but it is to be understood that it may be substantially followed for the manufacture of any of the other salts of lactic acid.

The whey from any of the sources mentioned is first neutralized with an acid binding compound containing the cation of the lactate salt being formed, in this instance, calcium, and we prefer to use, for neutralization purposes, calcium hydroxide. The oxide or carbonate of the cation of the lactic compound being formed, or mixtures of such compounds, may likewise be employed, e. g., calcium oxide or calcium carbonate. This neutralization proceeds to a point where the pH of the treated whey is in the range of substantially 6.5 to 7.5.

The neutralized whey is now permitted to ferment in order to develop lactic acid, and where a satisfactory lactic acid producing organism is not present in the whey, we add one of a suitable type. For example, we use an organism of the Bulgaricus type, or a mixture of organisms, such as Bulgaricus and Mycoderm. The whey is heated to substantially 110° F. or at any temperature which will accelerate complete fermentation of the contained lactose, and a suitable alkali, or salt, such as slaked lime (calcium hydroxide) or calcium carbonate or mixtures thereof is preferably added from time to time in quantity sufficient to maintain the pH of the fermenting liquor at a level suitable for optimum acid production by the organism used, for example pH 5.5 to pH 7.0. In so adjusting the pH from time to time, it is appreciated that the optimum hydrogen ion concentration may vary with the particular whey under treatment, as well as other conditions, and, as stated, the purpose of this adjustment is to maintain the liquor at a suitable level for optimum acid production. The temperature of the liquor and the adjustment just described are continued until all of the lactose present in the whey is used up and converted into lactic acid as determined by tests for residual sugar, e. g., Fehling's solution. At this point, when addition of alkali is discontinued, the liquor is usually in a partially neutralized state, but it may be neutral. Instead of using the hydroxide or carbonate of the cation of the lactate being formed or mixtures thereof for adjustment purposes during the formation of the lactic acid, the oxide and/or mixtures thereof with the hydroxide or carbonate, in this case calcium oxide, may be used.

It will be understood that during the fermentation step, the lactate salt, in this instance, calcium lactate, is formed by reaction of the calcium compound with the lactic acid developed.

The liquor while at the fermenting temperature of 110° F. or thereabouts, is now neutralized to a pH of substantially 6.5 to pH 7.5 with the oxide or hydroxide of the cation (calcium) of the lactate being formed, we having determined that, at this point in the process, it is most desirable that the liquor be substantially neutral.

The neutral liquor or substantially neutral liquor, preferably while still at the fermentation temperature, is now heated to a temperature of 180° F. to 250° F. Preferably, however, this heating is such as to give the liquor a temperature of about 212° F. In some cases, the temperature will be below the boiling point of water, and in other cases above the boiling point of water, as stated in the range above given.

This heating step is continued until the albuminous material and other substances foreign to the lactate being formed are thoroughly coagulated and in a condition where they settle rapidly to the bottom of the vessel in which the liquor is being heated. The heating step, just described, produces an accelerated coagulation of the colloidally dispersed proteins and substances which it is desired to eliminate as being foreign to the lactate compound under production, the proteins themselves acting as coagulants to occlude and adsorb various of the foreign substances which would constitute impurities in the final lactate product. There takes place in this heating step, therefore, a separating out or coagulation, i. e., aggregate formation of the dispersed albuminous and other undesired substances, and while other means may be employed, the heating step is preferable because of its simplicity, rapidity and economy. In the present instance, the coagulation is accompanied by a separating out, i. e., precipitation or sedimentation of the albuminous and other foreign substances, resulting in a supernatant liquor, namely, the calcium lactate solution and a precipitate or sediment or sludge of the undesired substances. After a suitable time, the heating step is discontinued and the hot liquor permitted to stand without further heating to sediment for a sufficient period.

Preferably, the supernatant liquor is decanted from the batch, and then the supernatant liquor and the sludge are individualy, i. e., each, subjected to a treatment in a filter press or centrifuge or other means to remove the albuminous and other foreign substances which have been separated out, and the filtrates or centrifugates then combined. This latter step of filtering, or centrifuging, the supernatant liquor and the sludge separately and obtaining the additive filtrate or centrifugates, is the preferred procedure.

However, the batch of hot liquor, after the desired separating out or coagulation has taken place is, in some cases, immediately transferred as a whole without decantation or separate recovery, respectively, of the lactate solution and coagulated bodies to the means for removing albuminous and other undesired substances and treated therein to recover the filtrate.

Where the mass in any case is thus treated, it is preferred to agitate the batch before its introduction to the filter press or centrifuge, so that the liquor under treatment will be uniform.

In any event, as the result of the mechanical separating or removing step, there results a clear filtrate which is substantially free of suspended material.

The albuminous material is obtained as a compact mass, e. g., a filter cake and dried. It will then constitute a nutritious stock food since it contains valuable minerals and milk proteins and other desirable products such as calcium lactate, resulting from the lactic fermentation.

The filtrate recovered by any of the processes mentioned is substantially neutral, and usually has a pH within the range of pH 6.5 to pH 7.5, and is now freed of a substantial proportion of the albuminous material and occluded and other impurities.

We have discovered that it is now possible to obtain from this filtrate a substantially pure, clear, water-white solution of the lactate, such as has not heretofore been possible, by recourse to steps which will now be described and which insure that the result will be obtained in a simple, inexpensive and expeditious manner. By this treatment of the neutral filtrate, any remaining albuminous or other foreign substances present are substantially completely removed. Thus, the neutral whey filtrate is given a treatment preferably with charcoal, such as animal or vegetable charcoal (norite) or some equivalent flocculant i. e. adsorbing agent capable of flocculating the albuminous and foreign substances, e. g., fuller's earth or "filter cel", which, in association with the use of an alkali compound, such as the oxide or hydroxide of the cation of the lactate being formed, will produce rapid and complete flocculation or separating out, or precipitation or sedimentation of any remaining undesired substances present in the filtrate. In other words, we have discovered that by combining the proper flocculating i. e. adsorbing material with the alkali and acting upon the filtrate with these materials, that the final result of a substantially pure water-white solution of the lactate compound is obtainable. In the use of these materials, the filtrate may be treated with the flocculating or adsorbing agent first, and then with the alkali, which is preferred, or the alkali may be used initially and thereafter the flocculating agent. In some cases, both substances may be used together to treat the filtrate simultaneously. As an example, of a preferred process of operation, to the neutral filtrate is added a fractional percentage of "norite" (vegetable charcoal), and the mixture is heated up to substantially 212° F., more or less, and maintained at this temperature for about fifteen minutes. The charcoal becomes uniformly dispersed in the filtrate and becomes attached to the proteins and other foreign substances while they are in dispersed condition i. e. acts as an adsorbent. The solution, at this point, appears black. To this mixture, either in slightly cooled condition or, if desired, at a temperature of about 212° F., there is added the hydroxide or the oxide of the cation (here calcium) of the lactate compound being made. The addition of the alkali is made while agitating the mixture, and this agitation is continued until a sample removed from the batch shows a sharp "break", that is, a grayish precipitate settles rapidly to the bottom of the sample vessel leaving a clear supernatant liquor above. At this point, it will be found that the filtrate is usually alkalinated to a pH of substantially pH 10 or greater. It is to be understood that the alkalination treatment, e. g., the addition of the alkali, which in combination with the charcoal produces a very effective separating out or flocculation, may take place while the liquor or filtrate is in a somewhat cool state or in a warm or hot condition. The treated liquor is stirred and well mixed, and is now subjected to a filter pressing or centrifuging operation, or other separating means whereby substances affecting the purity of the final product are removed. There is made thus a clear lactate solution, in the present instance, calcium lactate, which on examination is found to be substantially free of albuminous material, foreign substances occluded therein and, in fact, of substantially all undesirable materials, the presence of which would reduce the purity of the final lactate product. It is believed that the step of utilizing a flocculant i.e., an adsorbing material plus alkalination, has a very marked importance, in enabling production of a clear substantially pure water-white lactate solution and in eliminating any filtration difficulties which would otherwise be present and which would not only interfere with the recovery, but, of equal importance, in some instances, affect the apparatus as by clogging the filter cloth and thereby interfering with the efficiency of the operation.

The lactate solution, i. e., the calcium lactate solution, is neutralized with lactic acid, thus converting the excess alkalinity consisting of Ca(OH)$_2$ into calcium lactate. Of course, and while not preferred, other acids such as sulphuric or oxalic, may be used and the resultant precipitate, namely, calcium sulfate or oxalate filtered out or recovered.

The lactate solution, namely, the calcium lactate solution, is now concentrated, preferably in a vacuum pan, and the resulting concentrate allowed to crystallize. The crystals are washed with water, preferably in a centrifuge, and the washed crystals dried at some suitable temperature, depending upon the desired moisture content of the finished product. We shall hereinafter refer to this produce as "once crystallized" lactate.

If a lactate of even greater purity is desired, the above product is dissolved in hot water, treated with charcoal (animal or vegetable), filtered, concentrated, crystallized, washed with water in a centrifuge and dried. We shall hereinafter refer to this product as "twice crystallized" calcium lactate.

While we have illustrated above the production of calcium lactate, it is to be understood that the process is equally operable for the manufacture of various lactate salts of the alkali and alkali earth metals, ammonia, and trivalent metals, such as iron and aluminum. In some cases, however, it is desirable to proceed with the particular lactate salt, for example, calcium lactate, as just produced, for the manufacture of other lactate salts therefrom. This is true where the plant is equipped or the apparatus has been set up for the manufacture of one lactate salt and it is desirable to continue the manufacture of this salt, as well as to produce lactate salts of other metals. Under such circumstances, we have found that lactate salts of other metals may be readily produced from the calcium lactate by a simple and expeditious process which will now be described.

*Process II—Lactate salts derived from lactates of Process I*

Various lactate salts may be produced from the calcium lactate or other lactate salts made in the manner just described (Process I), for example, lactate salts of the alkali metals and the alkali earth metals, as well as trivalent metals and ammonium. Thus, we produce sodium and potassium lactates, ammonium lactate, magnesium lactate, and iron and aluminum lactates, as well as other lactate salts by reacting on the lactate salt of Process I with a soluble salt capable of forming an insoluble salt with the cation of the new lactate desired, e. g., sulphate, carbonate or oxalate.

In carrying out the process, by way of example, we will describe the manufacture of sodium lactate from the calcium lactate of Process I. Sodium lactate is a non-crystallizing syrup at all concentrations and in most of its properties bears a remarkable likeness to glycerin. It is readily made in highly purified state from lactate products of Process I as follows:—

(A) "Once crystallized" calcium lactate is dissolved in hot water and treated with a solution of sodium sulphate, sodium carbonate or other soluble sodium salt capable of forming an insoluble salt with calcium. Preferably, the solutions are reacted or mixed while they are in warmed or heated condition, e. g., at 212° F. or less, but reaction may be carried out at lower temperatures or in the cold, if desired.

In the case of sodium sulphate, for example, there results from the reaction, insoluble calcium sulphate which forms as a precipitate, and highly soluble sodium lactate. The latter is readily filter pressed or otherwise separated from the sulphate, and the sodium lactate solution so recovered is concentrated as described above, preferably in a vacuum pan, and recovered as a non-crystallizing syrup resembling glycerin. This product, we find, has a very high state of purity. Since the sodium lactate is a non-crystallizing syrup and hence cannot be crystallized and washed, it will be appreciated that the purity thereof is directly dependent upon the excellence of the calcium lactate. It is further to be noted, that the sodium lactate is obtained directly from the calcium lactate by a very simple inexpensive step, made possible by reason of the purity of the calcium lactate.

(B) "Twice crystallized" calcium lactate may also be treated as just described (Process II—A), and there is obtained a sodium lactate of even greater purity. This product, as with the previous product, is made, as will be appreciated, by a very simple treatment which can be readily carried out because of the high purity of the calcium lactate from which the sodium lactate is obtained.

(C) A somewhat lower grade of sodium lactate than either of the products just described (Process II—A and B) may be obtained by treating or reacting the purified hot concentrated calcium lactate liquor of Process I, before any crystallization, with the appropriate sodium salt. In many instances, this is a very satisfactory commercial process where special purity is not demanded. In this process, the two solutions may be mixed either at elevated temperature or in the cold, but it is preferred that the reaction take place at elevated temperature as indicated above. The purified, hot calcium lactate syrup of Process I is used, as stated, before crystallization, but it is preferably first concentrated in a vacuum pan or other similar apparatus. In some cases, the unconcentrated purified calcium lactate liquor of Process I at elevated temperature or in the cold, is reacted with the sodium salt and thereafter the reaction mixture is filter pressed and the sodium lactate obtained is then concentrated in a vacuum pan or other concentrating apparatus to make a product of desired concentration. Again, the crude unpurified calcium lactate liquor directly from the fermentation step of Process I is reacted at elevated temperature or in the cold with the sodium salt and the reaction product, sodium lactate recovered as described, as a relatively lower grade product than those derived from the purified liquors.

(D) The insoluble calcium salt of Process II—A—B and C, which constitutes the filter cake, is washed with water to recover any contained soluble lactate and subsequently removed from the filter press and dried to form articles of commerce, such as solid calcium sulphate, carbonate or oxalate.

LACTIC ACID

*Process III—Lactic acid from lactate salts of Process I*

We have discovered that a lactic acid of high purity can be obtained by treating the lactate salts produced in accordance with Process I, or Process II, but this latter is not preferred. The crystals from our "once crystallized" or "twice crystallized" calcium lactate, for example, are dissolved in hot water in a suitable container, such as a ceramic kettle, and there is added thereto concentrated or somewhat diluted sulphuric acid or oxalic acid, so that all of the calcium is precipitated as calcium sulphate or calcium oxalate, as the case may be. While I have referred to sulphuric and oxalic acids, it is to be understood that any acid may be used as will form an insoluble salt which will separate out and may be then settled out as a precipitate or may be separated by a suitable mechanical means.

The mixture is now filter pressed or centrifuged to recover the aqueous solution of lactic acid. The lactic acid will have various concentrations, for example, in some cases about 22%, which forms one satisfactory article of commerce. The insoluble calcium salt constituting the filter cake is washed in the filter press with water to recover any contained lactic acid and removed from the press and dried to form an article of commerce, such as calcium sulphate or oxalate.

*Process IV—Treatment of lactic acid by chemical reaction and flocculation*

This 22% acid, for example, will usually have appreciable color, particularly if prepared from a "once crystallized" lactate. The color is due to the presence of heavy metals, particularly iron, but these impurities may be removed in a very simple manner by adding a small quantity of an agent (1) which reacts with the heavy metals, (2) whose reaction product is insoluble and may be recovered as by centrifuging or filtering, and (3) which may be flocculated by a suitable flocculant. We mention as illustrating one agent having these properties a ferrocyanide, such as the calcium, sodium, or potassium ferrocyanide salt which is preferred, but others are available and may be used. The ferrocyanide reacts with the heavy metals of the lactic acid and a blue color develops.

Upon heating the so treated acid, to which has been added a fractional percentage of a charcoal, preferably a vegetable charcoal ("Norite") to the vicinity of the boiling point of water, the ferrocyanide compounds or reaction products of the heavy metals are flocculated and by means of a suitable procedure, such as filter pressing or centrifuging such compounds are removed and a water-white dilute acid is obtained. This likewise constitutes an article of commerce and, if desired, is transferred to a vacuum pan and concentrated by the removal of water to any desired level of acidity, e. g., 50% and even up to 85% concentration or greater. Each of these acids having such concentrations constitute articles of commerce where a high grade of lactic acid is desired.

The treatment with the agent and flocculant such as ferrocyanide-charcoal for example makes possible the ready concentration of the dilute lactic acid to a very high level of concentration without decomposition or darkening, and also speeds the evaporation and concentration, and reduces foaming otherwise occurring due to presence of impurities.

The presence of metallic impurities in the lactic acid, particularly iron and copper, brings about a catalytic reaction in the presence of heat and/or light, and in the course of which, dark, undesirable products are formed, so that concentration of lactic acid by addition of heat, as in the vacuum pan, results in an acid of undesirable appearance and properties. The use of a ferrocyanide reduces the heavy metal content of the lactic acid, so that these undesired and objectionable reactions cannot take place. This treatment with a chemical agent having the properties of a ferrocyanide and a flocculant such as charcoal is used with equal advantages in connection with each of the following processes of making lactic acid, namely Processes V, VI and VIII.

*Process V—Lactic acid produced from a lactate salt liquor*

After undergoing the two purification steps described in Process I, the neutralized lactate liquor, for example, is concentrated in the vacuum pan to substantially 18° Bé. Without waiting for the warm liquor to crystallize, this liquor, in its warm state or somewhat cooled, is treated with sulphuric acid to form lactic acid and calcium sulphate. While we have referred to sulphuric acids, other acids, such as oxalic, may be employed. The mixture is filter pressed or centrifuged, resulting in the recovery of a lactic acid of lower quality than that obtained from a calcium lactate which has been allowed to crystallize and the crystals washed. This product, while of lower purity than products made from calcium lactate which is "once crystallized" or "twice crystallized" is, nevertheless, a quite acceptable commercial article for certain uses.

If desired, the lactic acid thus obtained is now treated with a chemical agent and flocculant in the manner above set forth to remove or reduce heavy metals and improve the color, and of particular importance, to facilitate the vacuum concentrating operation whereby the dilute acid is concentrated and brought to any desired higher level of concentration, e. g., 50% and even up to 85% or greater.

*Process VI—Lactic acid from unconcentrated lactate liquor*

Instead of carrying out the process just described (Process V) in connection with the concentrated calcium lactate liquor, for example, of Process I, such Process V is used in connection with the lactate liquor or Process I before it is subjected to any concentration step in the vacuum pan, but after it has been subjected to the two successive purification steps.

*Process VII—Lactic acid from fermented liquor of Process I*

Likewise, the process just described (Process V) is carried out in connection with the fermented calcium lactate liquor, for example, of Process I, but which has not been subjected to the purification steps of Process I. The resulting acid will, however, be of a lower grade than any of those heretofore discussed, but does find utility in many cases where a cheap product is desired and where a higher quality is not necessary.

*Process VIII—Lactate salts from lactic acids*

Alkali metal and alkali earth metal lactates may be readily formed by treating any of the lactic acids heretofore described at any level of concentration with a suitable base (oxide or hydroxide) or a salt, the anion of which becomes a volatile product as a result of the reaction, e. g., calcium or sodium hydroxide, calcium or sodium carbonate, or calcium or sodium bicarbonate, and the purity of the alkali metal lactate thus obtained is controlled by the purity of the lactic acid used and assuming of course that the base or salt employed is, of itself, pure. In producing the lactate salts, a solution of the lactic acid is reacted with preferably a solution of the base or salt, e. g., sodium hydroxide although the latter may be in solid or crystalline condition, and the reaction may take place at either elevated temperature or in the cold. There is formed as a result of the reaction sodium lactate for example and water. The solution of the lactate salt so resulting is then concentrated if desired in a vacuum pan to the required concentration.

While we have referred herein to the formation of sodium lactate, it is to be understood that this process is useful in connection with the manufacture of potassium lactate, ammonium lactate, lactates of the trivalent metals, as well as lactates of the alkali earth metals, such as magnesium lactate.

*Building up process—Process IX*

As another process for making lactic acid, sufficient calcium lactate is dissolved in hot water so that when sulphuric acid is added in proper amount to liberate the lactic acid from the calcium lactate and the resulting mixture filter pressed to remove the calcium sulphate, there results an approximately 22% lactic acid solution. In this solution a further substantial amount of calcium lactate is dissolved by heating, if necessary, and again sulphuric acid is added to liberate a further increment of lactic acid and the resulting mixture again filter pressed. At this time, the lactic acid filtrate may contain 35 to 40% of lactic acid. A further increase in the concentration of lactic acid may be made by repeating the hitherto described procedure. It should be understood that the concentrations of lactic acid referred to above may be varied over wide limits in this process. The essential feature of this process consists of the dissolving of successive increments of calcium lactate in lactic acid followed by sulphuric acid treatment and resulting in a progressive increase in the concentration of the lactic acid. We have referred to calcium lactate as one example but lactates of other alkali metals are useful and with respect to the acid, other acids capable of performing the necessary purpose may be employed such as oxalic, and in fact, any acid which will form an insoluble calcium salt. The use of elevated temperatures for dissolving the calcium lactate in water or the lactic acid solution is generally preferred but is not essential to commercial operation.

We have referred herein to certain materials which are coagulated and removed, e. g., albuminous substances. These are useful for many purposes, being dried and forming a very satisfactory stock food, as above described.

This invention is capable of various changes and modifications, all of which are considered to be comprehended in the appended claims.

We claim:

1. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, and neutralizing the purified whey solution.

2. The process of making lactic compounds from whey comprising adding to the whey and reacting with lactic acid therein, an acid binding compound containing the cation of the lactic compound desired and forming the lactic compound in solution in the whey, coagulating albuminous and other undesired substances, removing the same from the whey solution, adding an adsorbing agent capable of adsorbing remaining albuminous and other undesired substances in the presence of an alkali, alkalinizing the whey solution for coagulating albuminous and other undesired substances to produce a separable mass, again removing the albuminous and other undesired substances from the whey solution, and neutralizing the purified whey solution.

3. The process of making lactic compounds from whey comprising adding to the whey and reacting with lactic acid therein an acid binding compound containing the cation of the lactic compound desired, adding to the whey solution of the lactic compound an adsorbing agent of the order of charcoal capable of adsorbing albuminous and other undesired substances in the presence of an alkali, alkalinizing the whey solution for coagulating albuminous and other undesired substances to produce a separable mass, removing the albuminous and other undesired substances from the whey solution, and neutralizing the purified whey solution.

4. The process of making lactic compounds from whey comprising adding to the whey and reacting with lactic acid therein an acid binding compound containing the cation of the lactic compound desired and forming the lactic compound in solution in the whey, coagulating albuminous and other undesired substances, removing the same from the whey solution, adding an adsorbing agent of the order of charcoal capable of adsorbing remaining albuminous and other undesired substances in the presence of an alkali, alkalinizing the whey solution for coagulating albuminous and other undesired substances to produce a separable mass, again removing the albuminous and other undesired substances from the whey solution and neutralizing the purified whey solution.

5. The process of making lactic compounds from whey comprising adding to the whey and reacting with lactic acid therein an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances in the presence of heat to produce a separable mass, removing the albuminous and other undesired substances from the whey solution, and neutralizing the purified whey solution.

6. The process of making lactic compounds from whey comprising adding to the whey and reacting with lactic acid therein an acid binding compound containing the cation of the lactic compound desired and forming the lactic compound in solution in the whey, coagulating albuminous and other undesired substances, removing the same from the whey solution, adding an adsorbing agent capable of adsorbing remaining albuminous and other undesired substances in the presence of an alkali, alkalinizing the whey solution for coagulating albuminous and other undesired substances in the presence of heat to produce a separable mass, again removing the albuminous and other undesired substances from the whey solution and neutralizing the purified whey solution.

7. The process of making lactic compounds from whey comprising adding to the whey and reacting with lactic acid therein an acid-binding compound containing the cation of the lactic compound desired and forming the lactic compound in solution in the whey, coagulating albuminous and other undesired substances, permitting the liquor to settle, decanting the supernatant liquor, and separately filtering the supernatant liquor and the liquor containing the sediment, combining the filtrates, adding an adsorbing agent, alkalinizing the filtrate solution for coagulating albuminous and other undesired substances to produce a separable mass, removing the same from the filtrate solution, and neutralizing the purified whey solution.

8. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, and neutralizing the purified whey solution with lactic acid.

9. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, and neutralizing the purified whey solution, and treating the lactate so formed with a soluble salt capable of forming an insoluble salt with the cation of the said lactate and containing the cation of the new lactate desired.

10. The process of making calcium lactate from whey comprising adding to the whey and reacting with lactic acid therein, an acid binding compound containing calcium, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, and neutralizing the purified whey solution.

11. The process of making sodium lactate from whey comprising adding to the whey and reacting with lactic acid therein, an acid binding compound containing calcium, adding to the whey solution of the lactic compound an adsorbing agent capable of absorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, and reacting with the calcium lactate solution, a soluble sodium salt capable of forming an insoluble salt with the calcium of the calcium lactate and sodium lactate in solution.

12. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, and reacting with said solution an acid which will form an insoluble salt and liberate lactic acid.

13. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the present of an alkali, alkalinizing the whey solution for coagulating albuminous and other undesired substances to produce a separable mass, removing the albuminous and other undesired substances from the whey solution, neutralizing the purified whey solution, and reacting with said solution an acid which will form an insoluble salt and liberate lactic acid, removing the lactic acid and treating the same with an agent which will only react with heavy metals present and form insoluble reaction products, and removing said heavy metal reaction products.

14. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution, for coagulating albuminous and other undesired substances to produce a filterable compound, removing the albuminous and other undesired substances from the whey solution, neutralizing the purified whey solution, and reacting with said solution an acid which will form an insoluble salt and liberate lactic acid, treating the lactic acid with a chemical agent capable of only reacting on heavy metals contained in the lactic acid and form insoluble reaction products, and with an adsorbing agent for causing the reaction products to coagulate, and removing said heavy metal reaction products.

15. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, and reacting with said solution an acid which will form an insoluble salt and liberate lactic acid, treating the lactic acid containing heavy metals with a chemical agent capable of only reacting therewith and form insoluble reaction products, and with an adsorbing agent, in the presence of heat to cause the heavy metal reaction products to coagulate, and removing said heavy metal reaction products.

16. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, and reacting with said solution an acid which will form an insoluble salt and liberate lactic acid, treating the lactic acid containing heavy metals with a ferrocyanide capable of reacting therewith, and with an adsorbing agent in the presence of heat, to cause the heavy metal reaction products to coagulate, and removing said heavy metal reaction products.

17. The process of making lactic compounds from whey comprising adding to the whey and reacting with lactic acid therein, an acid binding compound containing the cation of the lactic compound desired, adding to the whey solution of the lactic compound and adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, reacting with said solution an acid which will form an insoluble salt and liberate lactic acid, and reacting said purified lactic acid with a compound containing the cation of a desired lactate salt.

18. The process of making lactic compounds from whey comprising adding to the whey and reacting with lactic acid therein, an acid binding compound containing the cation of the lactic compound desired, adding to the whey solution of the lactic compound an adsorbing agent capable of adsorbing albuminous and other undesired substances in the presence of an alkali, alkalinizing the whey solution for coagulating albuminous and other undesired substances to produce a separable mass, removing the albuminous and other undesired substances from the whey solution, neutralizing the purified whey solution, reacting with said solution an acid which will form an insoluble salt and liberate lactic acid, and reacting said lactic acid with a compound containing sodium.

19. The process of making lactic acid comprising repeatedly dissolving an alkali earth metal lactate in lactic acid and reacting the lactate with another acid capable of forming an insoluble salt and lactic acid and removing the insoluble salt reaction product, the lactate and acid being in proportions and the steps being repeated a sufficient number of times to progressively, for each such repetition of steps, increase the concentration of the lactic acid and build up a desirable concentration thereof.

20. The process of making lactic compounds from whey, comprising converting lactose in the whey to lactic acid, adding to the whey and reacting with lactic acid therein an acid binding compound containing the cation of the lactic compound desired, and forming the lactic compound in solution in the whey, coagulating albuminous and other undesired substances, removing the same from the whey solution, adding an adsorbing agent capable of adsorbing remaining albuminous and other undesired substances in the presence of an alkali, alkalinating the whey solution for coagulating albuminous and other undesired substances, to produce a separable mass, and again removing the albuminous and other undesired substances from the whey solution.

SAMUEL M. WEISBERG.
FRANK L. CHAPPELL.
WILLIAM E. STRINGER.
STODDARD STEVENS.
HENNING A. TREBLER.